(No Model.)

J. W. WALLACE.
STERILIZER FOR BANDAGES, &c.

No. 552,157. Patented Dec. 31, 1895.

WITNESSES:
Milton M. Goldsmith
H. E. Spencer

INVENTOR
John W. Wallace
BY H. A. West
ATTORNEY

UNITED STATES PATENT OFFICE.

JOHN W. WALLACE, OF BROOKLYN, NEW YORK.

STERILIZER FOR BANDAGES, &c.

SPECIFICATION forming part of Letters Patent No. 552,157, dated December 31, 1895.

Application filed January 14, 1895. Serial No. 534,747. (No model.)

*To all whom it may concern:*

Be it known that I, JOHN W. WALLACE, a citizen of the United States, and a resident of Brooklyn, in the county of Kings and State of New York, have invented certain new and useful Improvements in Sterilizing Apparatus for Bandages, &c., of which the following is a specification.

My invention relates to sterilizing apparatus designed mainly for use in hospitals and by physicians and surgeons for sterilizing bandages, towels, &c., and surgical instruments; and the object of my invention is to provide an apparatus for this purpose whereby steam may be generated in a very short space of time which may be used for sterilizing bandages, towels, &c., and whereby a large quantity of water may be heated during the steaming process ready for immersing the instruments.

In the approved method of sterilizing, all bandages, towels, &c., are subjected to the action of hot steam in a closed vessel, which must be continued for about fifteen minutes as the minimum time. The instruments are sterilized by direct immersion in hot water, where they remain not longer than five minutes, for a longer heating is liable to draw the temper of the steel and impair the cutting-edges.

By my invention a small quantity of water is supplied from a reservoir or tank to the bottom of the sterilizer, which may be heated to the point of generating steam without loss of time, and while steam is being thus generated the body of water in the reservoir or tank is being gradually heated ready to be admitted to the sterilizer, so that from the first heating of a thin film of water, which may be effected in a few seconds, to the end of an operation there is always hot water at hand.

Figure 1:
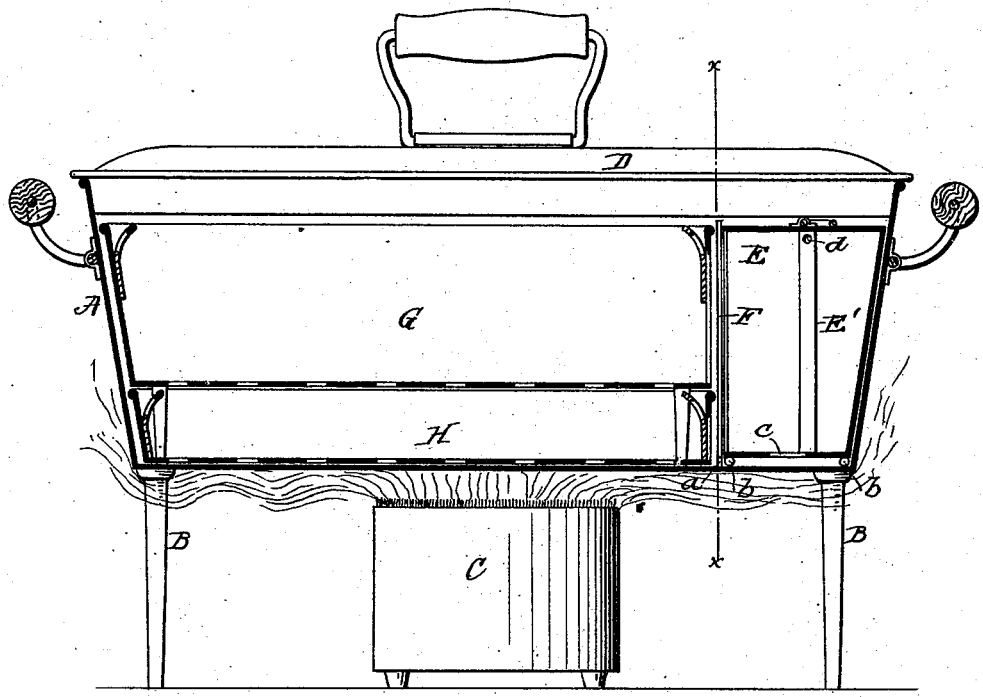
Figure 2:
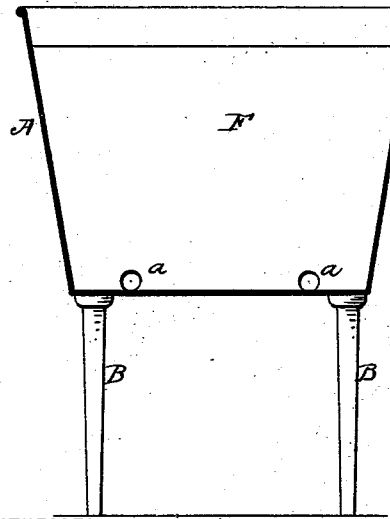
Figure 3:
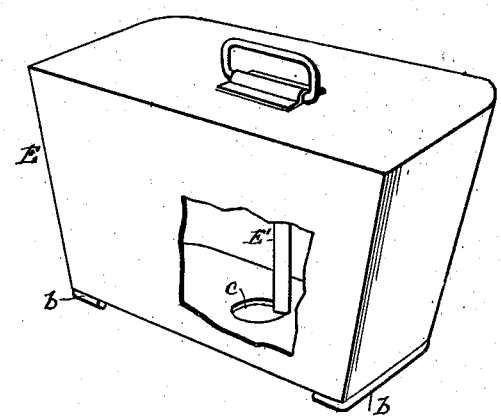

In the accompanying drawings, Figure 1 is a sectional elevation of my new sterilizer. Fig. 2 is a transverse sectional view taken on line *x x* of Fig. 1, and Fig. 3 is an enlarged perspective view of the reservoir or tank removed.

A represents the body of the sterilizer supported on legs B, so that it may be conveniently heated by an alcohol or other lamp C placed beneath its bottom. The body is closed by a lid or cover D. At one end of and within the body of the sterilizer is placed a reservoir or tank E for water. This reservoir is by preference separated from the main body by a partition F having one or more holes $a$ at its bottom, as shown clearly in Fig. 2. The reservoir is slightly elevated from the bottom of the sterilizer by small supports, beads or flanges $b\ b$, (shown clearly in Figs. 1 and 3,) and in its bottom is formed an aperture $c$ which is sealed by a thin film of water which emerges from the reservoir as soon as the depth of the film reaches the bottom of the reservoir, so that the thickness of the supports $b$ determine the depth of the film.

G H represent trays with perforated bottoms placed in the body of the sterilizer, the former, G, to support or receive bandages, towels, &c., the latter, H, to support instruments to be immersed in hot water.

Within the reservoir or tank E is secured a vent-tube E', reaching from the aperture $c$ up to the top of the reservoir, and this tube is formed with one or more small apertures $d$ at or near its top to admit air above the water in the reservoir when the pressure of steam in the reservoir forces water out through the aperture $c$, thus obviating excessive air-pressure upon the walls of the reservoir.

In operation the tank or reservoir E will be filled with water and the aperture $c$ closed with the finger and then inverted and quickly placed in the body of the sterilizer. The water will flow from the reservoir and flow over the bottom of the sterilizer until it rises to the bottom of the reservoir, when it will seal the aperture in the bottom of the reservoir and stop the flow. It will also seal the lower end of the vent-tube which is emptied of water in the act of placing the reservoir in the body of the sterilizer. The cover D will now be placed on the body of the sterilizer, inclosing its contents and the reservoir E, so that when heat is applied not only the contents of the body will be heated but also the water in the reservoir. The film of water in the body will speedily be heated to the point of rapidly giving off steam, which will be confined by the cover. When the water in the reservoir becomes heated, which will take from fifteen to thirty minutes, according to the size, it becomes a fountain of hot water which will be automatically discharged into the main body of the sterilizer by pressure of steam above the water in the reservoir, so that there is no interruption of the sterilizing process—that is to say, from the time steam is first generated from the thin film (which takes but a few seconds) to the end of the operation there is always hot steam in the sterilizer, and a portion of the time there is a sufficient quantity of hot water. The vent-tube E' being empty of water the partial vacuum formed by the automatic discharge of hot water will be supplied therethrough, so that the external pressure will not collapse the reservoir or part its seams.

Having thus described my invention, what I claim as new, and desire to secure by Letters Patent, is—

1. A sterilizer comprising a main body closed by a cover, combined with a reservoir or tank within the main body to be heated therewith, and formed with an aperture at its lower end, substantially as and for the purposes set forth.

2. A sterilizer comprising a main body closed by a cover, combined with an inverted reservoir inclosed by the cover and formed with an aperture in its bottom, and provided with supports to determine the depth of the film of water on the bottom of the main body prior to the discharge of its heated contents substantially as described.

3. A sterilizer comprising a main body closed with a cover, combined with a reservoir placed in said main body and formed with an aperture in its bottom, and provided with a vent tube reaching from the bottom to, or nearly to, the top of the reservoir substantially as described.

4. A sterilizer comprising a main body provided with a partition having holes at or near its bottom, in combination with a reservoir or tank having an apertured bottom placed in the compartment formed by the said partition, and a cover to inclose the reservoir and the main body of the sterilizer substantially as described.

JOHN W. WALLACE.

Witnesses:
H. A. WEST,
MILTON M. GOLDSMITH.